(12) United States Patent
Christophe

(10) Patent No.: US 8,601,454 B2
(45) Date of Patent: Dec. 3, 2013

(54) DEVICE AND METHOD FOR AUTOMATICALLY OPTIMIZING COMPOSITE APPLICATIONS HAVING ORCHESTRATED ACTIVITIES

(75) Inventor: Benoit Christophe, Nozay (FR)

(73) Assignee: Alcatel Lucent, Paris (FR)

( * ) Notice: Subject to any disclaimer, the term of this patent is extended or adjusted under 35 U.S.C. 154(b) by 1275 days.

(21) Appl. No.: 12/333,452

(22) Filed: Dec. 12, 2008

(65) Prior Publication Data

US 2009/0158263 A1  Jun. 18, 2009

(30) Foreign Application Priority Data

Dec. 13, 2007  (EP) .................................. 07301667

(51) Int. Cl.
 *G06F 9/45* (2006.01)
 *G06F 9/44* (2006.01)

(52) U.S. Cl.
 USPC ............................ 717/151; 717/104; 717/160

(58) Field of Classification Search
 None
 See application file for complete search history.

(56) References Cited

U.S. PATENT DOCUMENTS

| | | | | |
|---|---|---|---|---|
| 6,243,863 | B1* | 6/2001 | Kothari et al. ................. | 717/149 |
| 6,571,386 | B1* | 5/2003 | Figurin et al. ................. | 717/154 |
| 7,316,000 | B2* | 1/2008 | Poole et al. .................... | 717/104 |
| 7,873,422 | B2* | 1/2011 | Dumas et al. ................... | 700/29 |
| 8,042,092 | B2* | 10/2011 | Koehler et al. ................ | 717/106 |
| 8,156,484 | B2* | 4/2012 | Smith ............................ | 717/154 |
| 8,230,386 | B2* | 7/2012 | Sedukhin et al. ............. | 717/104 |
| 2002/0066088 | A1* | 5/2002 | Canut et al. .................... | 717/151 |
| 2003/0149717 | A1 | 8/2003 | Heinzman | |
| 2005/0138600 | A1* | 6/2005 | Pavlovic et al. .............. | 717/104 |
| 2007/0135936 | A1* | 6/2007 | Dumas et al. ................... | 700/29 |
| 2007/0174101 | A1* | 7/2007 | Li et al. .............................. | 705/8 |
| 2007/0240112 | A1* | 10/2007 | Haselden et al. ............. | 717/121 |
| 2007/0300213 | A1* | 12/2007 | Adolphson et al. ........... | 717/151 |
| 2008/0147221 | A1* | 6/2008 | Sukesh et al. ................. | 700/100 |
| 2008/0161940 | A1* | 7/2008 | Gerwens et al. ................. | 700/4 |
| 2008/0271004 | A1* | 10/2008 | Choi et al. ..................... | 717/151 |
| 2009/0313615 | A1* | 12/2009 | Joshi et al. ..................... | 717/154 |

OTHER PUBLICATIONS

Deelman et al.Pegasus: A framework for mapping complex scientific workflows onto distributed systems, Scientific Programming, vol. 13, No. 3, 2005, pp. 219-237 Retrieved on [Jul. 17, 2013] Retrieved from the Internet: URL<http://iospress.metapress.com/content/84h5q70awx6fau0w/>.*

Tsai et al.RTSOA: Real-Time Service-Oriented Architecture. Service-Oriented System Engineering, 2006. pp. 49-56, Retrieved on [Jul. 17, 2013] Retrieved from the Internet: URL<http://ieeexplore.ieee.org/stamp/stamp.jsp?tp=&arnumber=4027117>.*

(Continued)

*Primary Examiner* — Thuy Dao
*Assistant Examiner* — Cheneca Smith
(74) *Attorney, Agent, or Firm* — Fay Sharpe LLP

(57) ABSTRACT

A device (D) is intended for optimizing composite applications comprising at least two orchestrated activities participating to at least one process. This device (D) comprises i) an analyzing means (AM) arranged for determining orchestrated activities contained into a composite application to be optimized and dependencies between these activities, and ii) an optimizing means (OM) arranged for determining a new orchestration between the determined activities which allows the composite application to execute requests of users in a minimal time, according to the determined dependencies and to predefined rules, and for outputting an optimized composite application based on the new orchestration.

7 Claims, 1 Drawing Sheet

(56) References Cited

OTHER PUBLICATIONS

Figure 1:
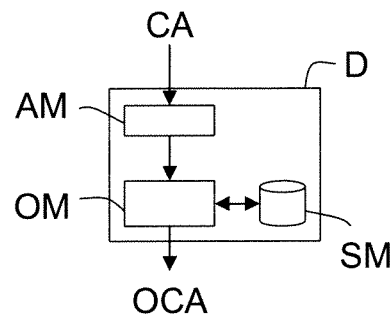

Weiland et al., "A Critical Path Tool for Parallel Simulation Performance Optimization,", Proceedings of the Twenty-Fifth Hawaii International Conference, IEEE, vol. II, pp. 196-206, Jan. 7, 1992.

Broberg et al., "Performance Optimization Using Extended Critical Path Analysis in Multithreaded Programs on Multiprocessors," Journal of Parallel and Distributed Computing, vol. 61, No. 1, pp. 115-136, 2001.

Landwehr et al., "A New Optimization Technique for Improving Resource Exploitation and Critical Path Minimization," System Synthesis, 1997, Proceedings, Tenth International Symposium on Antwerp, Belgium, 1997, Los Alamitos, CA, USA, IEE Comput. Soc. US, pp. 65-72, Sep. 17, 1997.

Lin et al., "A Cost-Effective Critical Path Approach for Service Priority Optimization in the Grid Computing Economy," Proceedings of the International Conference on Information Technology: Coding and Computing, ITCC, vol. 2, pp. 100-104 (pp. 1-5), Apr. 5, 2004.

European Search Report, Jun. 8, 2008.

* cited by examiner

DEVICE AND METHOD FOR AUTOMATICALLY OPTIMIZING COMPOSITE APPLICATIONS HAVING ORCHESTRATED ACTIVITIES

The present invention relates to composite applications comprising a plurality of orchestrated activities and more precisely to optimization of such applications.

One means here by "composite application" an application made of independent and/or dependent software modules defining activities (or tasks) participating to at least one process, and generating a workflow (i.e. a set of ordered activities depending one from the other and being executed in an organized (or orchestrated) manner in order to produce a chosen result).

Moreover one means here by "activity" a work that is carried out by at least one operation or service that is already implemented or that is able to find the work it has to carry out by understanding the meaning of what is expected from it through a semantic analysis. Such an activity is generally fed with at least one input data (or input message) and delivers at least one output data (or output message). For instance, an activity may consist in retrieving chosen information or data in a chosen place or equipment, or in translating a text from a first language to a second language.

As it is known by the man skilled in the art, there are many tools (or devices) that allow developers to create and then validate a composite application. These tools or complementary ones may be also capable of analyzing the workflow of a composite application in order to provide statistical results relative to the time spent by every one of its activities (or tasks). These results offer some help to the application developers, but they do not inform about possible wastes of time introduced by the orchestration of the application activities during execution of user requests. Such wastes of time may occur when, for instance, activities or groups of activities having no relation between them (i.e. with no common input/output, no common shared variable, and no relation deduced from a semantic analysis) are executed sequentially (i.e. one after the other) instead of being parallelized.

One means here by "orchestration" the timing between activities, i.e. when an activity in the overall application must be started compared with the other ones of the same application. For instance, if an application process comprises a first activity intended for retrieving chosen information in a chosen place or equipment, and a second activity consisting in translating retrieved information from a first language to a second language, then the application orchestration consists in carrying out the second activity once the first activity is finished.

Because of these wastes of time, the results of the user requests are not delivered to the users within an optimal time, which may result in a not usable workflow.

So the object of this invention is to optimize automatically the composite applications in order they execute the user requests in a minimal time.

For this purpose, the invention provides a device, intended for optimizing composite applications comprising at least two orchestrated activities participating to at least one process, and comprising:

an analyzing means arranged for determining orchestrated activities contained into a composite application to be optimized and dependencies (or links) between these activities, and an optimizing means arranged for determining a new orchestration between the determined activities which allows the composite application to execute requests of users in a minimal time, according to the determined dependencies and to predefined rules, and for outputting an optimized composite application based on this new orchestration.

The device according to the invention may include additional characteristics considered separately or combined, and notably:

its optimizing means may be arranged for determining a new orchestration according to predefined rules that are chosen in a group comprising at least Service Oriented Architecture (SOA) design patterns based on constraint(s) relative to the activities;

for instance, one rule may require that independent activities be parallelized, another rule may require that an activity invoked inside a loop be parallelized when it is possible, and still another rule may require that an activity participating several times to the same workflow with the same inputs be moved in order to be executed as soon as possible;

its optimizing means may be arranged, in case where the analyzing means has determined several activities participating to several processes, for determining a new orchestration of the activities of each process and of these processes;

its optimizing means may be arranged, in case where the analyzing means has determined several activities participating to one process, for determining a new orchestration in which these activities participate to at least two sub-processes defining the process (a sub-process being a set of at least one activity).

The invention also provides a computer software product comprising a device such as the one above introduced.

The invention also provides a method, intended for optimizing composite applications comprising at least two orchestrated activities participating to at least one process, and consisting:

in determining orchestrated activities contained into a composite application to be optimized and dependencies between these activities, in determining a new orchestration between the determined activities which allows the composite application to execute requests of users in a minimal time, according to the determined dependencies and to predefined rules, and in outputting an optimized composite application based on this new orchestration.

The method according to the invention may include additional characteristics considered separately or combined, and notably:

one may determine each new orchestration according to predefined rules chosen in a group comprising at least Service Oriented Architecture (SOA) design patterns based on constraint(s) relative to said activities;

in case where several activities participating to several processes have been determined, one may determine a new orchestration of the activities of each process and of these processes;

in case where several activities participating to one process have been determined, one may determine a new orchestration in which these activities participate to at least two sub-processes defining the process (a sub-process being a set of at least one activity).

Figure 2:
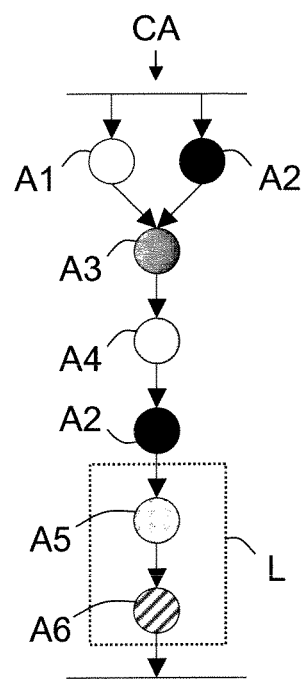
Figure 3:
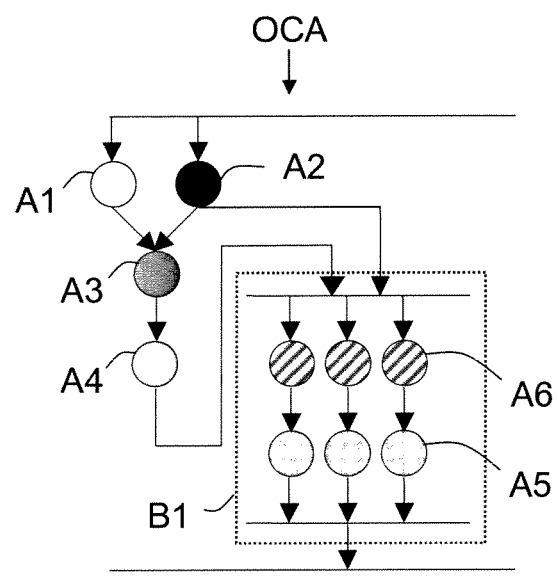

Other features and advantages of the invention will become apparent on examining the detailed specifications hereafter and the appended drawings, wherein:

FIG. 1 schematically illustrates an example of embodiment of a device according to the invention, FIG. 2 schematically illustrates an example of composite application, and FIG. 3 schematically illustrates an example of optimization of the composite application illustrated in FIG. 2.

The appended drawings may serve not only to complete the invention, but also to contribute to its definition, if need be.

The invention aims at offering a device, and an associated method, intended for optimizing automatically composite applications in order they execute user requests in a minimal time.

In the following description it will be considered that the composite applications to optimize are dedicated to services offer to users of communication equipment connected to a communication network (whatever the type). But the invention is not limited to this kind of composite application. Indeed, it concerns any type of composite application as soon as it comprises independent and/or dependent software modules which define activities (or tasks) participating to at least one process, and generating a workflow.

Moreover, in the following description it will be considered that the composite applications are written with a workflow language such as BPEL (Business Process Execution Language). But the invention is not limited to this type of workflow language. Indeed, it concerns any type of workflow language allowing to produce codes which define at least partly interactions or dependencies between activities.

As it is schematically illustrated in the unique figure, a device D according to the invention comprises at least an analyzing module AM and an optimizing module OM.

Such a device D may be localized into a computer, for instance. It is preferably made of software modules, at least partly. But it could be also made of electronic circuit(s) or hardware modules, or a combination of hardware and software modules (in this case the device D comprises also a software interface allowing software modules to understand hardware components). In case where it is made of software modules it can be stored in a memory of a computer or in any computer software product, such as a CD-ROM, for instance, which can be read by a computer or the like.

The analyzing module AM is intended for analyzing the content (i.e. the modules) of each composite application CA that its device D receives onto an input. More precisely, it determines every orchestrated activity contained into a received composite application CA and then the dependencies (or links) between these activities.

One means here by "dependency" any type of direct or indirect relation or link existing between at least two activities participating to the same process or to different processes of the same application CA. So it may be a common input or output, a shared variable, or a relation or link that can be deduced from a semantic analysis. For instance, there is a dependency between first and second activities when the second one requires an output data of the first one as input data.

The semantic analysis consists in analyzing the semantics of the text of a composite application CA in order to determine relationships between requirements. For instance, a process may comprise a first activity consisting in making a flight reservation for Mr X and a second activity consisting in making a hotel reservation for Mr X. As it is not usually common to make the hotel reservation if there is no available flight, a semantic analysis will determine that there is a link (or dependency) between the first and second activities (the second one depending on the result of the first one).

It is important to note that a composite application can be made of modules defining at least two activities (or tasks) participating either to one process, or to at least two sub-processes (possibly respectively) of one process, or even to at least two processes (possibly respectively, which means that each process may correspond to a single activity). A sub-process means here a set of at least one activity giving a result. So, the analyzing module AM is arranged to determine dependencies between activities participating to the same process, or to sub-processes of a process, or even to processes of the same composite application CA. Generally speaking, the analyzing module AM determines any dependencies existing between any activities participating to the same process, or to sub-processes of a process, or even to processes of the same composite application CA.

It is also important to recall that a composite application CA is a set of activities that are orchestrated in order to produce a chosen result.

For instance, the analyzing module AM can determine the activity dependencies by analyzing the declaration of variables of the software modules defining these activities, the inputs and outputs of each activity of a process, and possibly the semantics of the composite application CA.

Once the analyzing module AM has determined every activity dependencies it disposes of constraints between the activities that it can, for instance, represent by means of a dependency tree.

The optimizing module OM intervenes each time the analyzing module AM has finished to determine the activities of a composite application CA and their dependencies. More precisely, its intervention consists notably in determining a new orchestration between the determined activities which allows the composite application CA to execute requests of users in a minimal time. In other words, the optimizing module OM tries to determine the best way to design the composite application CA in order to start each activity as soon as possible to get its results as fast as possible from the application process(es) point of view.

Such a determination is carried out while taking into account the activity dependencies (and the possible dependency tree) that have been determined by the analyzing module AM and also a set of predefined rules.

As it is not restrictively illustrated in FIG. 1, the predefined rules may be stored into a storing means SM of the device D, such as a register, for instance. But, they may be stored into the optimizing module OM, or in a storing means external to the device D but to which it can access.

For instance, the predefined rules are Service Oriented Architecture (SOA) design patterns based on at least one constraint relative to the application activities. But any type of rules taking into account the constraint(s) relative to the application activities can be used, since the rule is written according to a formalism that can be understood and applied by the device D.

For instance, one of the predefined rules may require that the independent activities (i.e. without dependencies (or links) between them) be parallelized in order to be started as soon as possible.

Another one of the predefined rules may require that an activity which is invoked several time inside a loop L be parallelized each time it is possible.

Still another one of the predefined rules may require that an activity participating several times to the same workflow with the same inputs be moved in order to be executed as soon as possible. In other words, the device D will have to determine identical activities that appear several times in a process (or sub-process) with the same inputs in order to delete each one of these duplicate activities. In this case, a variable representing the result of the execution can be positioned in order to reduce the execution time of the workflow by simply reading the current value of this variable instead of executing the activity again. This requires to store the variable value.

These two simple examples of predefined rules are given as not restrictive and not exhaustive examples. A lot of other predefined rules may be used.

Once the optimizing module OM has finished to determine a new orchestration for a composite application CA, it rearranges the software modules of the latter according to this new orchestration in order to build an optimized composite application OCA that it delivers on an output.

A not restrictive example of composite application CA is illustrated in FIG. 2. In this example, the composite application CA comprises six activities A1 to A6 (Ai, with i=1 to 6). The output data of the first activity A1 and of a second activity A2 feed the third activity A3. The output data of the third activity A3 feed the fourth activity A4. The output data of the fourth activity A4 feed the second activity A2 present in the process for the second time. Finally the output data of the second activity A2 feed a loop L comprising the fifth A5 and sixth A6 activities (for instance each of the fifth A5 and sixth A6 activities is invoked three times inside the loop L for transmitting personalized messages to different users, for instance).

A not restrictive example of optimization of this example of composite application CA is illustrated in FIG. 3. In this example, the optimizing module OM has determined that the second activity A2 can be started in parallel with the first activity A1 (block B1), because no one of them requires the output data of the fourth activity A4, and that the fifth and sixth A6 activities invoked three times in the loop L can be parallelized (block B2) because they both require the same output data of the fourth activity A4 and of the second activity A2.

So, now:
the second activity A2 is started in parallel with the first activity A1,
the output data of the first activity A1 and of the second activity A2 feed the third activity A3,
the output data of the third activity A3 feed the fourth activity A4,
the output data of the fourth activity A4 and of the second activity A2 feed three sixth activities A6 that are started in parallel in the same time, and
the output data of the three sixth activities A6 feed respectively three associated fifth activities A5 in order they deliver in parallel the output data of the optimized composite application OCA (that are expected by different users, for instance).

So, if the fifth activities A5 are respectively dedicated to three different users, then each of these users will receive the expected output data corresponding to their requests in the same time and faster than it was possible with the initial composite application CA. Indeed, as soon as the output data of the fourth activity A4 are available, they are now both provided with the output data of the second activity A2 to the three sixth activities in parallel, while before one started a second time the second activity A2 once the output data of the fourth activity A4 were available and then one started the loop L to start three times consecutively the fifth A5 and sixth A6 activities while feeding them with the same input data in order to deliver at the end of each loop L the expected output data.

The invention can also be considered in terms of a method for optimizing automatically composite applications comprising at least two orchestrated activities participating to at least one process.

Such a method may be implemented by means of a device D such as the one above described with reference to FIG. 1. Therefore, only its main characteristics will be mentioned hereafter.

The method according to the invention consists:
in determining orchestrated activities contained into a composite application CA to be optimized and dependencies between these activities,
in determining a new orchestration between the determined activities which allows the composite application CA to execute requests of users in a minimal time, according to the determined dependencies and to predefined rules, and
in outputting an optimized composite application OCA based on this new orchestration.

The invention is not limited to the embodiments of method and device described above, only as examples, but it encompasses all alternative embodiments which may be considered by one skilled in the art within the scope of the claims hereafter.

The invention claimed is:

1. A processor-implemented method of optimizing composite applications comprising at least two orchestrated activities participating to at least one process, the method comprising:
determining orchestrated activities contained in a composite application to be optimized and dependencies between these activities;
determining a new orchestration between said determined activities which allows said composite application to execute requests of users in a minimal time, according to said determined dependencies and to predefined rules;
determining each new orchestration according to predefined rules chosen in a group comprising at least Service Oriented Architecture design patterns based on at least one constraint relative to said activities,
wherein said rules comprise at least a rule requiring that independent activities be parallelized, a rule requiring that an activity invoked inside a loop be parallelized when possible, and a rule requiring that an activity participating several times to a same workflow with the same inputs be moved in order to be executed as soon as possible; and
outputting an optimized composite application based on said new orchestration.

2. The method according to claim 1, further comprising: in a case where several activities participating to several processes have been determined, determining a new orchestration of the activities of each process and of said processes.

3. The method according to claim 1, further comprising in a case where several activities participating to one process have been determined, determining a new orchestration in which said activities participate to at least two sub-processes defining said process.

4. A device having a central processing unit configured to optimize composite applications comprising at least two orchestrated activities participating in at least one process, the device comprising:
an analyzer that is operative to determine orchestrated activities contained in a composite application to be optimized and dependencies between these activities; and
an optimizer that is operative to determine a new orchestration between said determined activities which allows said composite application to execute requests of users in a minimal time, according to said determined dependencies and to predefined rules, wherein said optimizer is further operative to determine a new orchestration according to predefined rules chosen in a group comprising at least Service Oriented Architecture design patterns based on constraint(s) relative to said activities, wherein said rules comprise at least a rule requiring that independent activities be parallelized, a rule requiring that an activity invoked inside a loop be parallelized when possible, and a rule requiring that an activity participating several times to a same workflow with the same inputs be moved in order to be executed as soon as possible, and to output an optimized composite application based on said new orchestration.

5. The device according to claim 4, wherein said optimizer is further operative to, in a case where said analyzer has determined several activities participating to several processes, determine a new orchestration of the activities of each process and of said processes.

6. The device according to claim 4, wherein said optimizer is further operative to, in a case where said analyzer has determined several activities participating to one process, determine a new orchestration in which said activities participate to at least two sub-processes defining said process.

7. The device according to claim 4 included in a computer software product.

* * * * *